R. O. WONES.
PUMP.
APPLICATION FILED FEB. 1, 1919.
1,392,670.
Patented Oct. 4, 1921.
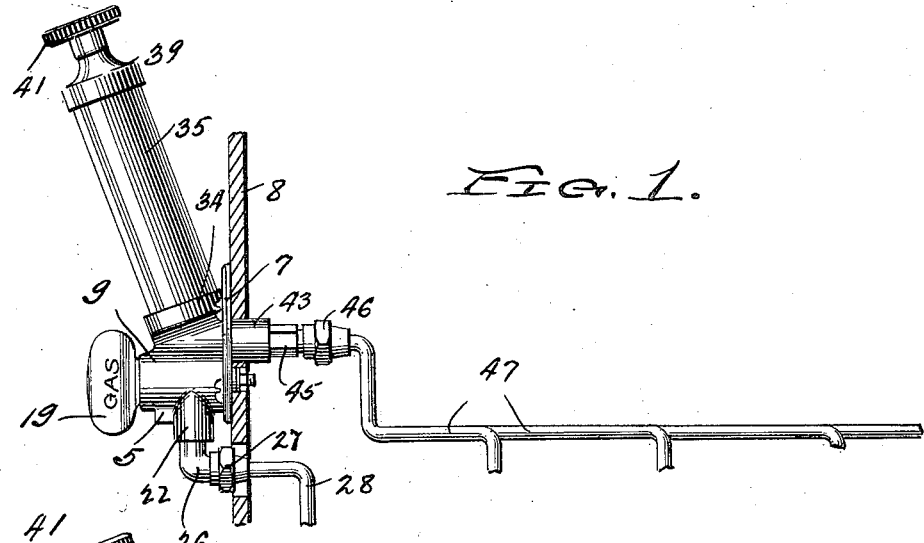
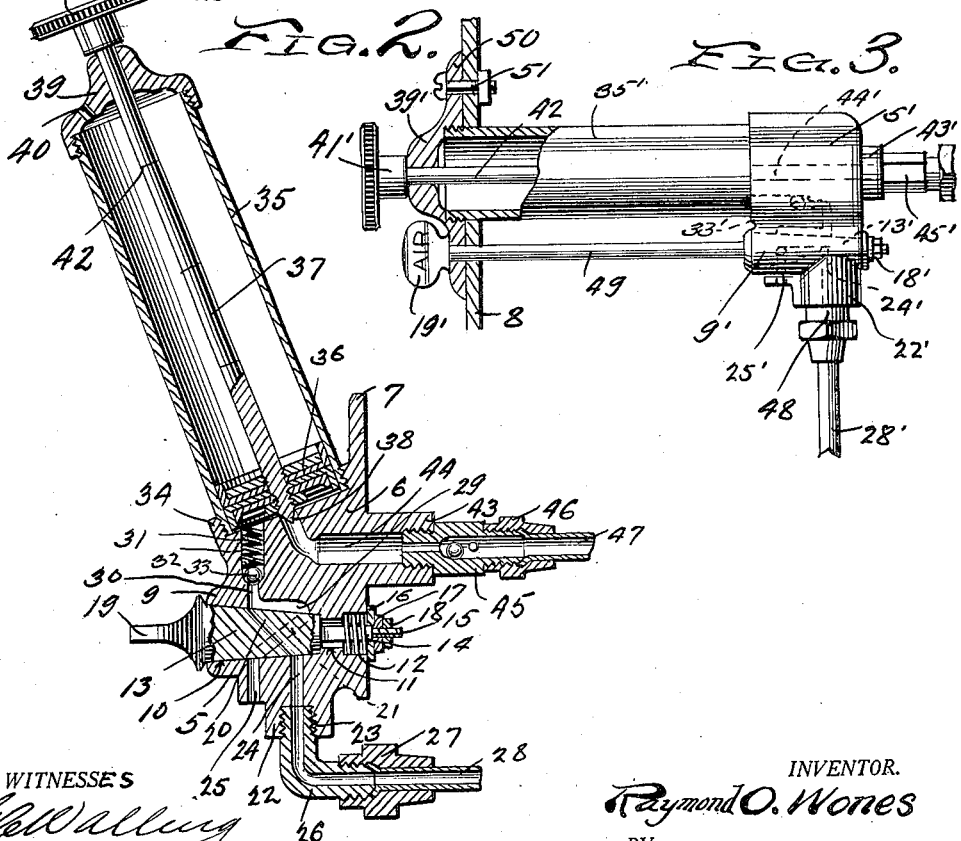
WITNESSES
INVENTOR.
Raymond O. Wones
BY
ATTORNEY.

UNITED STATES PATENT OFFICE.

RAYMOND O. WONES, OF MAPLEWOOD, OHIO.

PUMP.

1,392,670.  Specification of Letters Patent.  Patented Oct. 4, 1921.

Application filed February 1, 1919. Serial No. 274,406.

*To all whom it may concern:*

Be it known that I, RAYMOND O. WONES, a citizen of the United States, residing at Maplewood, in the county of Shelby and State of Ohio, have invented certain new and useful Improvements in Pumps, of which the following is a specification.

This invention relates in general to internal combustion engines and more specifically to a pump which is constructed to facilitate the priming of the cylinders of an engine when necessary.

One object of this invention is the production of a manually operated pump wherein means are provided for collecting a charge of gas which is directed to the cylinders of an engine.

Another object of this invention is the production of a pump, which is supported upon a valve casing, this casing also communicating with a source of liquid fuel supply and also with the outer atmosphere, a communication being provided with a cut off, whereby when desired the cut off may be operated for allowing the gas and air to be drawn into the pump whereupon this mixture may then be forced through suitable conduits to the priming device of the cylinders of an engine.

Another object of this invention is the production of a pump which is simple and compact in construction, thus facilitating its mounting in a desired position for operation and under such conditions requiring only a minimum amount of space.

One practical form of construction and assembly of the present invention together with a slight modification thereof, are illustrated in the accompanying drawing, in which:—

Figure 1 is a side elevation of the pump, the dash supporting the same being shown in section and the several conduits being broken away.

Fig. 2 is an enlarged vertical section through the device illustrated in Fig. 1, and Fig. 3 is a fragmentary side elevation of a slightly modified form of the present invention.

In the preferred embodiment of the present invention about to be described, 5 indicates in general the valve casing. This valve casing 5 comprises the body 6 having the supporting plate 7 thereon whereby the pump may be supported in a desired position upon the dash 8 of an automobile or other like vehicle.

The body 6 is provided with a horizontally extending cylindrical portion 9 having the tapering bore 10 extending therethrough as shown in Fig. 2. A reduced bore 11 communicates with the inner end of the tapering bore 10 and the socket 12 is formed in the opposite side of the body 6 to communicate with the opposite end of the reduced bore 11.

The rotary valve 13 tapers from its outer end toward the inner end thereof to fit snugly within the tapering bore 10. This rotary valve has a shank 14 extending from its inner end and terminating in a threaded extension 15. A spring 16 fits within the socket 12 and bears upon the washer 17, this washer 17 being retained by the nut 18. Accordingly the tension of the coil spring 16 will tend to hold the rotary valve 13 firmly within the tapering bore 10 of the body 6 although permitting the valve 13 to rotate. For the purpose of rotating this valve there is provided a wing 19 thereon, this wing having different indicating legends on its opposite surfaces, such as the word "gas" or "air" as suggested by Figs. 1 and 3. The valve 13 is also provided with grooves 20 and 21 for purposes to be hereinafter set forth.

The body 6 has a depending neck 22 in which there is formed a threaded socket 23. The passage 24 leads from the inner end of the threaded socket 23 to the tapering bore 10. An air passage 25 is formed in the body 6 and extends substantially parallel to the passage 24 and also communicates with the tapering bore 10.

The elbow 26 is screwed into the socket 23 and communicates with the passage 24. This elbow 26 is connected by the coupling 27 with the tube 28 leading to the liquid fuel supply. A recess 29 communicates with the tapering bore 10 and has the passage 30 leading therefrom to communicate with the pocket 31 in which is carried the coil spring 32 and the ball valve 33. The bearing of the spring 32 upon the ball valve 33 permits passage through the pocket 31 in one direction although preventing repassing through the pocket, thus constituting a check valve.

The internally threaded supporting flange 34 is carried on the body 6 and the barrel 35 is screwed into engagement with this flange 34. A piston 36 which may be of any desired construction is carried within the barrel 35 and is mounted upon the threaded end of the piston rod 37. It should be noted that the inner end of the rod 37 is tapered as shown in 38 for purposes to be hereinafter explained. This rod 37 passes through the cap 39 as shown in Fig. 2. This cap 39 is screwed onto the outer end of the barrel 35 forming a closure therefor, and this cap is provided with an opening 40. An operating head 41 is secured to the outer end of the rod 37 and this rod 37 is also provided with indicating lines 42 thereon.

A cylindrical extension 43 is formed on the body 6 and has a passage 44 passing therethrough and also through the body to communicate with the interior of the barrel 35. The valved nipple 45 is provided with a suitable coupling 46 for attaching the several conduits 47 thereto, these conduits in turn being suitably connected to the cylinders of an engine.

As will be apparent from an inspection of Fig. 3 the modified form of the invention is so constructed as to have the major portion of the pump carried upon the forward side of the dash and nearer to the engine so that the projecting parts will be those necessary to the operation of the device and thus increase the unobstructed space adjacent the dash and also minimizing possibility of injury to the device by accidental striking of the same.

The valve casing 5' is provided with a hollow cylindrical portion 9' in which the rotary valve 13' is mounted and retained by suitable retaining means 18'. The neck 22' has a connection 48 for securing the tube 28' thereto. The stem 49 leads from the rotary valve 13' and passes through the dash 8 to support the wing 19'. Thus it will be seen that the wing 19' may be gripped and turned for shifting or turning the valve 13'.

The barrel 35' is connected to the valve casing 5' and has a cap 39' mounted upon its opposite end. This cap 39' is provided with an enlarged flange 50 secured as indicated at 51 upon the dash 8. The head 41' is carried by the piston rod 42' in the manner shown in Fig. 2.

The valve casing 5' is provided with a passage 44' leading to the neck 43' to which the valve coupling 45' is secured and in turn is connected in the manner illustrated in the preferred form to the cylinders of the engine. In connection with this form of the invention it should also be noted that a check valve 33' is provided an air passage 25' and a gas passage 24'.

*Operation.*—When it is desired to provide the engine with a highly combustible mixture, the wing 19 is turned to bring the groove 21 of the rotary valve into communication with the air passage 25. The head 41 of the piston rod 37 is pulled away from the cap, thus retracting the piston 36 from the inner end of the barrel 35. This action will cause a suction within the barrel and as the valved nipple 45 will prevent a back flow into the barrel, this suction will remove the ball valve 33 from its seat and thus draw air through the passage 25 into the recess 29 and then into the passage 30 and the pocket 31 into the barrel 35. When it is desired to draw gas into the barrel 35 it will be easily understood that the rotary valve is operated so as to place the groove 20 into communication with the pocket 29 and the passage 24. Piston rods 37 have the indicating lines 42 to allow the operator to determine how far the rod should be drawn to cause the valve to receive a desired quantity of either air or gas as may be desired. As soon as outward movement of the piston rod is stopped, it is obvious that the ball valve 33 will return to its seated position and thus constitute a check valve.

Although the operation of the preferred form of the invention has been set forth, it is obvious that the operation of the modified form is identically similar. The difference between the two devices, is, as above pointed out, the manner in which they are supported. Although the barrel 35 is carried upon the rearward side of the dash in the preferred form it is seen that instead of having the flange 34 thereof slanted upwardly at an angle it may be turned in a vertical manner and thus cause the barrel to extend horizontally while by placing the valve casing on the forward side of the dash 8 the rotary valve may be easily operated by the stem 49.

The foregoing description and accompanying drawings have reference to what might be considered to be the preferred or approved form of my invention. I desire it to be understood that I may make such changes in the construction, combination and arrangement of parts, materials, dimensions, et cetera, as may prove expedient and fall within the scope of the appended claims.

Having thus fully described my invention what I claim as new and desire to secure Letters Patent, is:—

1. In a device of the class described, the combination of a valve casing, said casing having an air passage and a gas passage communicating with a recess, pump means connected to said casing, said casing also having communications between said pump means and said casing and a check valve within said communication, a valve for regulating the passage through said air passage and said gas passage, said casing having an exhaust passage communicating with said pump means, whereby the pump means may draw air or gas through said check valve into the pump means and then drive the same from the pump means to the exhaust passage.

2. In a device of the class described, the combination of a valve casing including a bore, said casing having an air passage and a gas passage, a rotary valve carried within said bore, a recess communicating with said bore, said casing also having a pocket terminating in a passage communicating with said recess, a check valve carried within said pocket, a pump barrel connected to said casing, a piston positioned within said barrel, a rod connected to said piston, a cap carried by said barrel and guiding said rod, whereby when said piston is reciprocated it will draw air or gas into said passages and said check valve into the barrel, said casing being provided with an exhaust passage whereby upon further movement of the piston the air or gas will be driven from the barrel through the exhaust passage.

In testimony whereof I affix my signature in presence of two witnesses.

RAYMOND O. WONES.

Witnesses:
L. W. BAKER,
THOS. G. STEPHENSON.